United States Patent [19]

Meguro

[11] Patent Number: 4,683,510
[45] Date of Patent: Jul. 28, 1987

[54] LOCK MECHANISM FOR TAPE PROTECTIVE CLOSURE FOR MAGNETIC TAPE CASSETTE

[75] Inventor: Niroshi Meguro, Miyagi, Japan

[73] Assignee: Sony Corporation, Tokyo, Japan

[21] Appl. No.: 711,521

[22] Filed: Mar. 14, 1985

[30] Foreign Application Priority Data

Apr. 10, 1984 [JP] Japan .................................. 59-71462

[51] Int. Cl.[4] ..................... G11B 23/087; G11B 15/32
[52] U.S. Cl. ..................................... 360/132; 242/199
[58] Field of Search ................... 360/132, 60; 352/75, 352/76; 242/197–199

[56] References Cited

U.S. PATENT DOCUMENTS

| | | | |
|---|---|---|---|
| 1,942,891 | 1/1934 | Wittel | 352/75 |
| 2,095,850 | 10/1937 | Wittel | 352/75 |
| 2,206,032 | 7/1940 | Foster | 352/76 |
| 2,505,661 | 4/1950 | Briskin et al. | 352/76 |
| 3,615,155 | 10/1971 | Gelbman | 242/118 |
| 3,628,955 | 12/1971 | Haist | 96/61 |
| 3,705,699 | 12/1972 | Siller | 242/199 |
| 3,962,727 | 6/1976 | Kamimura et al. | 360/132 |
| 4,032,987 | 6/1977 | Singer et al. | 360/132 |
| 4,045,821 | 8/1977 | Fujikura | 242/197 X |
| 4,091,426 | 5/1978 | Umeda | 360/74 |
| 4,208,681 | 6/1980 | Hatchett | 360/97 |
| 4,320,424 | 3/1982 | Murayama | 360/96.5 |
| 4,343,024 | 8/1982 | Kawai | 360/74.6 |
| 4,363,059 | 12/1982 | Matsuzawa et al. | 360/132 |
| 4,402,024 | 8/1983 | Kato | 360/96.5 |
| 4,449,677 | 5/1984 | Ohta et al. | 242/199 |
| 4,498,112 | 2/1985 | Georgens et al. | 360/132 |
| 4,524,926 | 4/1983 | Nemoto et al. | 242/198 |
| 4,527,755 | 7/1985 | Rood et al. | 242/199 |
| 4,561,031 | 12/1985 | Tanabe | 360/96.5 |
| 4,568,990 | 2/1986 | Ueno et al. | 360/96.5 |
| 4,572,461 | 2/1986 | Horikawa et al. | 242/198 |

FOREIGN PATENT DOCUMENTS

| | | |
|---|---|---|
| 0030367 | 6/1981 | European Pat. Off. |
| 0045083 | 2/1982 | European Pat. Off. |
| 0088438 | 9/1983 | European Pat. Off. |
| 0097964 | 1/1984 | European Pat. Off. |
| 0103314 | 3/1984 | European Pat. Off. |
| 0135195 | 3/1985 | European Pat. Off. |
| 0144802 | 6/1985 | European Pat. Off. |
| 0159591 | 10/1985 | European Pat. Off. |
| 2145999 | 4/1985 | United Kingdom . |
| 2152009 | 7/1985 | United Kingdom . |
| 2150916 | 7/1985 | United Kingdom . |
| 2157265 | 10/1985 | United Kingdom . |
| 2155905 | 10/1985 | United Kingdom . |
| 2165819 | 4/1986 | United Kingdom . |

Primary Examiner—Stuart N. Hecker
Assistant Examiner—Alyssa H. Bowler
Attorney, Agent, or Firm—Vorys, Sater, Seymour & Pease

[57] ABSTRACT

A magnetic tape cassette is provided with a pivotal closure lid pivotably secured to both sides of a casing for movement between a closed position, in which the front opening of the casing, through which a magnetic tape is accessible for loading onto a rotary head, is covered, and an open position wherein the closure lid is pivoted away from said opening to expose the tape while the cassette is in use. The magnetic tape cassette is also provided with a sliding closure member slidably mounted on the bottom of the casing and cooperative with the aforementioned pivotal closure lid. The sliding closure member is in a closed position while the pivotal closure lid is in its closed position, in which it covers a bottom clearance through which a device constituting part of a tape holding system is inserted, and in an open position while the pivotal closure lid is in its open position to allow the aforementioned device of the tape handling system to reach into the casing through the bottom clearance. A locking lever holds the sliding closure in the current one of its two positions. The sliding closure holds the pivotal closure closed while in its own closed position.

20 Claims, 12 Drawing Figures

LOCK MECHANISM FOR TAPE PROTECTIVE CLOSURE FOR MAGNETIC TAPE CASSETTE

BACKGROUND OF THE INVENTION

The present invention relates generally to a magnetic tape cassette, especially adapted to recording and reproducing pulse code modulated (PCM) signals. More specifically, the invention relates to a magnetic tape cassette provided with a tape protective closure covering a front opening through which a magnetic tape is extracted and accessed, and a locking mechanism for locking the closure open when the cassette is in use and locking it closed when not in use.

In recent years, various recording and reproducing apparatus have been developed which convert analog signals, such as audio signals and the like into a digital signal, e.g. PCM signal, which is then recorded on and reproduced from magnetic tape serving as a recording medium. Some of these apparatus employ rotary heads in order to achieve a relatively high recording density. Recording and reproducing apparatus specifically designed to record and reproduce PCM signals and employing a rotary head will be referred to as "PCM recorder" throughout the disclosure. A PCM recorder, at first, pulls a loop of a magnetic tape out through a front opening of the cassette and winds the tape around a rotary drum accommodating the rotary head and then the recording and reproducing is performed. In such digital recording and reproducing systems, oily deposits, such as fingerprints or the like, and/or dust adhering to the tape surface may cause dropout of reproduced signals.

Various approaches have been tried to protect the magnetic recording medium. For example, a closure lid may be used to retractably cover the front end opening of the cassette, through which the tape is extracted for access by a rotary head. This closure lid is held closed while the tape is not in use and is moved to an open position when the cassette is inserted into the PCM recorder. In this earlier approach, a drawback may be encountered when the closure lid is unintentionally or accidentally opened, exposing the tape to oily fingerprints, dust and so forth while it is not in use. A locking mechanism which can conveniently lock the closure lid in its open and closed positions could resolve this problem.

SUMMARY OF THE INVENTION

Therefore, it is an object of the invention to provide a magnetic tape cassette with a tape protective closure for covering the front opening of the cassette, through which a magnetic tape is extracted for loading onto a rotary head, and a lock mechanism for conveniently and reliably locking the closure in its open position when the cassette is in use and in its closed position when not in use.

Another and more specific object of the invention is to provide a magnetic tape cassette having a locking mechanism which normally holds the closure in its closed position and is unlocked when inserted into a corresponding PCM recorder and locked in its open position while the cassette is in use.

In order to accomplish the above-mentioned and other objects, a magnetic tape cassette, according to the invention, is provided with a pivotal closure lid pivotably secured to opposite edges of a casing for movement between a closed position, in which the front opening of the casing through which a magnetic tape can be extracted for loading onto a rotary head while not in use, and an open position wherein the closure lid is pivoted away from said opening to allow access to the tape while in use. The magnetic tape cassette is also provided with a sliding closure member slidably mounted on one face of the casing and cooperative with the aforementioned pivotal closure lid. The sliding closure member is held either in a closed position while the pivotal closure lid is in its closed position to cover a bottom spacing through which a device constituting part of a tape handing mechanism may be inserted, or an open position while the pivotal closure lid is in its open position to allow the aforementioned device of the tape handling mechanism to engage the casing through the bottom spacing for extracting the tape for loading onto the rotary head. The sliding closure member is retained in its closed and open positions by means of a locking member. The locking member is formed integrally with the cassette casing and adapted to resiliently establish locking engagement with the sliding closure member. The locking member has an locking head engageable to the sliding closure member but not protruding from the lower surface of the sliding closure member.

In the preferred, embodiment, the locking member comprises a resilient arm integrally extending from the bottom of the cassette casing and a locking head formed integrally with the free end of the resilient arm. The locking head has a round top releasably engageable with holes formed in the sliding closure member at locations corresponding to the closed and open positions of the sliding closure member relative to the cassette casing.

With the cassette construction set forth above, a smooth locking engagement and release from the engaged position can be assured by the effect of a rounded top of the locking head. Also, by positioning the locking head inside the cassette casing, accidental or unexpected release of the locking engagement can be satisfactorily and successfully prevented.

In addition, in the preferred constuction, a torsion spring is used to exert a biasing force on the sliding closure member toward the closed position. This torsion spring may simplify the structure of the cassette.

According to one aspect of the invention, a magnetic tape cassette comprises a cassette casing having a mouth through which a magnetic tape is accessible, the mouth including a first opening in a front end face of the casing and a second opening in a lower section of the casing adjacent the front end face, a pivotal lid covering and exposing the first opening of the mouth, a sliding shutter member slidable with respect to the lower section of the cassette casing and adapted to cover and expose the second opening of the mouth, the shutter member being movable between a first position in which it covers the second opening and a second position in which it exposes the second opening, and a resilient locking lever integrally formed with the cassette casing and having a resiliently deformable lever and a round head engageable with the shutter member, the locking lever normally holding the shutter member in the first position while the cassette is not in use, and allowing the shutter member to move to the second position when the cassette is inserted into an associated recording and reproducing apparatus.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment illustrated but are for explanation and understanding only.

In the drawings.

DESCRIPTION OF THE PREFERRED EMBODIMENT

Figure 1:
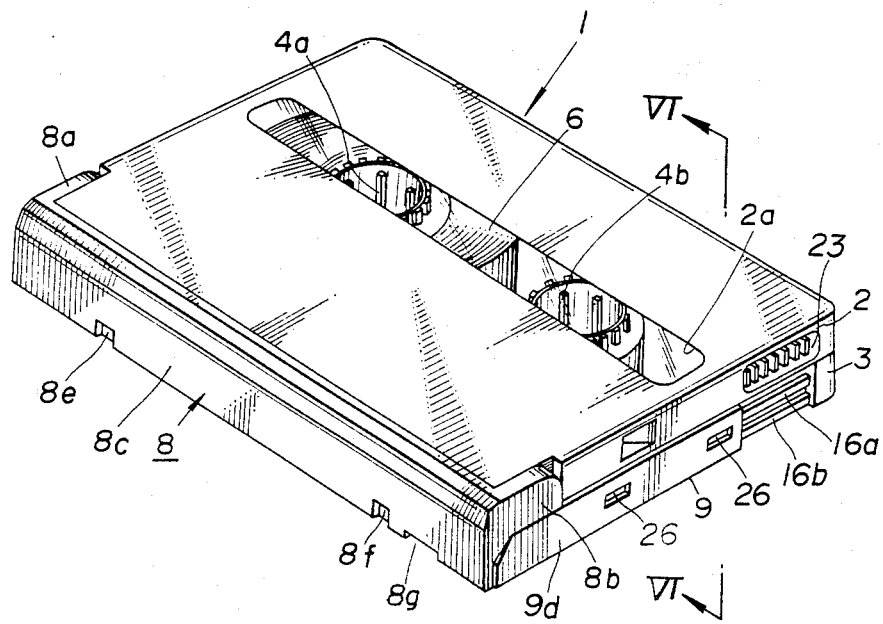
FIG. 1 is a perspective view of the preferred embodiment of a magnetic tape cassette in accordance with the present invention, in which a pivotal closure lid and a sliding closure member are in their respective closed positions.
Figure 2:
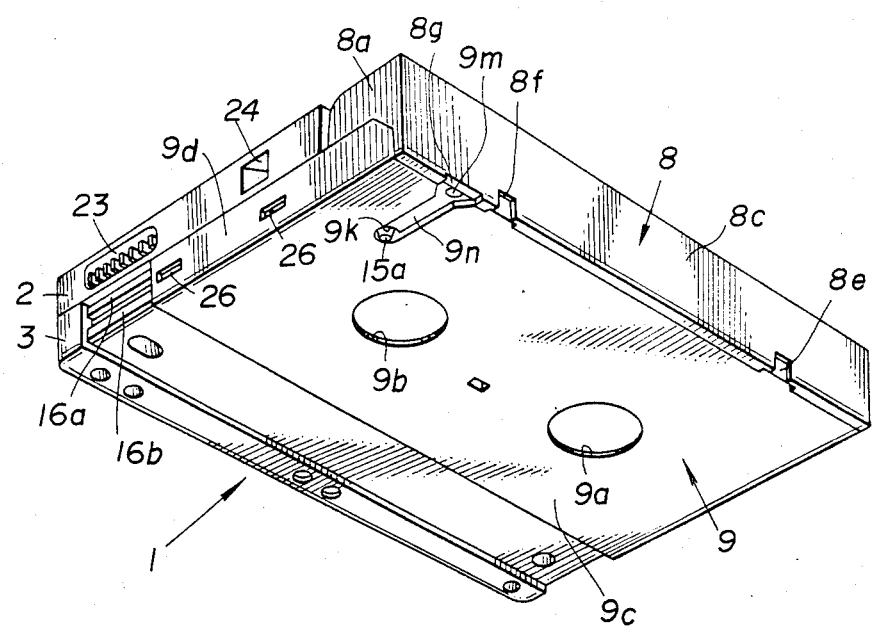
FIG. 2 is a perspective view of the magnetic tape cassette of FIG. 1, viewed from below the cassette, in which the pivotal closure lid and the sliding closure member are in their respective closed positions, corresponding to the position illustrated in FIG. 1.
Figure 3:
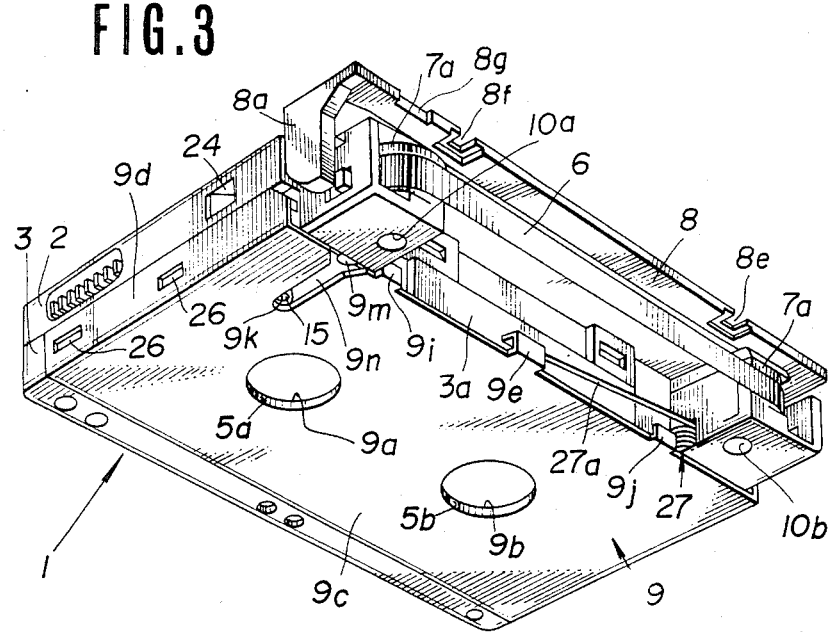
FIG. 3 is a perspective view of the magnetic tape cassette of FIG. 1, viewed from below the cassette, in which the pivotal closure lid and the sliding closure member are in their respective open position during use of the cassette.
Figure 4:
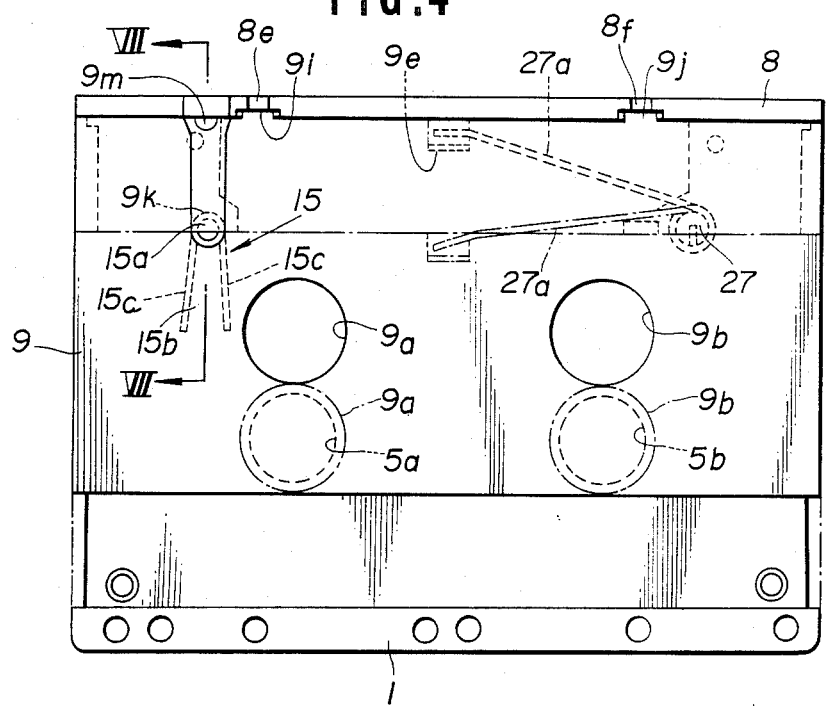
FIG. 4 is a bottom view of the magnetic tape cassette with a sliding closure member in its closed position.

Referring now to the drawings, particularly to FIGS. 1 to 3, the preferred embodiment of a magnetic tape cassette according to the present invention generally comprises a casing 1 including an upper section 2 and a lower section 3 which are connected by threaded bolts (not shown) in a per se well-known manner to form a single unit. A transparent window plate 2a is built into the upper surface of the upper section 2. A pair of reel hubs 4a and 4b incorporated into the cassette casing 1 rotatably engage a pair of reel shaft insertion apertures 5a and 5b. The apertures 5a and 5b are formed in the lower section 3 at predetermined positions which establish a suitable spacing between the reel hubs 4a and 4b. A magnetic tape 6 is wound around the reel hubs 4a and 4b.

A pivotal closure lid 8 is rotatably or pivotally attached at the right and left side walls of the cassette casing near the front end of the tape cassette. When the pivotal closure lid 8 is pivoted away from the front surface of the tape cassette, the magnetic tape 6 is exposed, as shown in FIG. 3. An essentially rectangular cut-out 3a is formed in the front end of the lower section 3. When the magnetic tape cassette is inserted into a PCM recorder which will be briefly discussed later, a tape guide system or a device constituting part of a tape retaining mechanism (not shown) is inserted into the cut-out portion 3a and pulls out some of the tape 6 for loading onto a rotary head of the PCM recorder. A sliding closure member 9 engages the lower section 3 and covers and exposes the cut-out portion 3a as it slides back and forth.

While the tape cassette is not in use, the pivotal closure lid 8 is located opposite a front opening formed in the front surface of the casing 1 to cover the latter. At the same time, the sliding closure member 9 is in its forwardly-shifted position in which it covers the cut-out portion 3a of the lower section 3 and thus prevents the tape guide system from reaching into the tape cassette for the tape, as shown in FIG. 2. The closure lid 8 can pivot away from the front surface of the cassette to expose the magnetic tape 6, and the sliding closure member 9 can move to the rear to expose the cut-out portion 3a so that the tape guide system can reach into the cut-out portion 3a to draw some of the magnetic tape 6 out of the cassette casing for loading onto a rotary drum for recording or playback. Thereafter, when the recording or playback is over and the tape cassette is returned to the stand-by state, the pivotal closure lid 8 and the sliding closure member 9 are returned to the aforementioned closed positions. Throughout the rest of this document, the positions of the pivotal closure lid 8 and the sliding closure member 9 in which they cover the front opening and the cut-out portion 3a respectively will be referred to as a "closed position" and the position of the lid 8 and the sliding closure 9 in which they expose the front opening and the cut-out portion 3a will be referred to as an "open position".

The cassette casing 1 also has a pair of tape guide columns 7a and 7b integrally formed to the left and right sides of the front edge of the lower section 3, as shown in FIG. 3. The magnetic tape 6 is stretched between and around the tape guide columns 7a and 7b so as to follow a predetermined tape run or path along the front edge of the tape cassette and across the front opening over the rotary head.

The cut-out portion 3a of the lower section 3 extends over a predetermined width so as to expose the rear surface of the magnetic tape 6 stretched between the tape guides 7a and 7b. During recording or reproduction, a device constituting part of the tape handling system of the tape guide system projects into the cut-out portion 3a and draws out a section of the magnetic tape 6. The tape handling system is part of the PCM recorder.

The pivotal closure lid 8 is elongated along the major dimension of the front opening and has arms 8a, 8b projecting from its opposite ends which pivotably attach the lid 8 to the front of the cassette casing 1 by means of pivot shafts (not shown). Thus, the pivotal closure lid 8 can be pivoted to selectively cover and expose the front opening of the cassette casing 1. The closure lid 8 also comprises a plate 8c which is elongated in the direction of the opening in the cassette casing 1 and covers the entire length of the front of the cassette casing 1. When the closure lid 8 is rotated to the closed position to cover the front of the cassette casing 1, the arms 8a and 8b lie flush with the contours of the upper section 2 as best shown in FIGS. 1 and 2. When the closure lid 8 is in this position, the sliding closure 9 is held in its forward position under the arms 8a and 8b as shown in FIGS. 2 and 3 by means described later. The rotary shafts about which the lid 8 pivots are approximately centered on the inner surfaces of the respective arms 8a, 8b. Cut-away portions 8e, 8f are formed by cutting small grooves into the lower edge of the plate 8c toward the left and right extremes of the cut-out portion 3a of the lower section 3.

The sliding closure member 9 has a flattened U-shaped configuration and is so mounted on the lower section 3 of the cassette casing 1 that it can slide back and forth parallel to the lower surface of the lower cassette section 3. Apertures 9a and 9b respectively corresponding to the reel shaft insertion apertures 5a and 5b are formed in the sliding closure member 9 in such positions that after the sliding closure member 9 slides all the way backwards to expose the cut-out portion 3a, the apertures 9a and 9b are respectively aligned with the reel shaft insertion apertures 5a and 5b.

The sliding closure member 9 comprises a flat plate 9c which lies parallel to the lower surface of the lower section 3 and side plates 9d along the left and right sides of the flat plate 9c which lie parallel to the outer surfaces of the left and right side walls of the lower section 3. Flanges (not clearly shown) are formed by bending the upper ends of the side plates 9d inwardly. The flanges are restrained vertically but not horizontally between the side walls of the upper and lower sections 2, 3 after the casing 1 is assembled.

Contact pieces 9i and 9j extend upwards perpendicularly from the flat plate 9c at the front of the plate at positions which correspond to the cut-away portions 8e and 8f of the closure lid 8. The contact pieces 9i and 9j enable the recording-reproducing apparatus to slide the closure 9 to the rear in preparation for opening the cassette 1 in a manner described later.

A hook 9e is formed on the front edge of the flat plate 9c. The hook 9e is centered between the contact pieces 9i and 9j. One leg 27a of a torsion spring 27, the coil of which is housed in the front portion of the lower section 3, engages the hook 9e. The torsion spring exerts a forward biasing force on the sliding closure member 9. When the sliding closure member 9 is in its open position, as shown in FIG. 3, the torsion spring 27 is stressed and exerts a counteracting force biasing the sliding closure member 9 toward its closed position.

Figure 5:
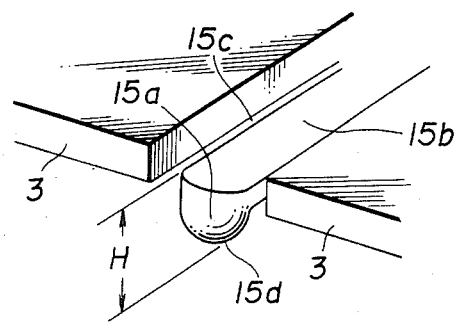
FIG. 5 is an enlarged perspective view of a crucial part of the preferred embodiment of the magnetic tape cassette of FIG. 1.

The sliding closure member 9 is also formed with a circular hole 9k and a semicircular cut-out 9m. The semicircular cut-out 9m is located at the front end of the sliding closure member 9. A thin groove 9n is formed on the lower surface of the sliding closure member 9 in the region where the hole 9k and the cut-out 9m are formed. The groove 9n has a tapered end opening onto the front end of the sliding closure member 9. The hole 9k and the cut-out 9m are so arranged as to engage a locking projection or head 15a of a locking lever 15 which is integrally formed with the lower section 3. As will be appreciated, the locking lever 15 has a resilient lever section 15b which is thinner than the rest of the lower section for added flexibility. The locking head 15a projects downwards from the free end of the locking lever section 15b. Along both sides of the locking lever section 15b, elongated slots 15c separate the locking level section 15b from the lower section 3. This enhances the flexibility of the locking lever section 15b for freer movement of its free end, as shown in FIG. 5. The locking projection 15a has a rounded top 15d which extends downwards through the hole 9k or the cut-out 9m. The height H of the locking head 15a is selected so that the top 15d of the head 15a can lie flush with the lower surface of the sliding closure member, within the groove 9n and so that the top 15d of the head 15a can rest atop the lower surface of the sliding closure member 9.

Figure 6:
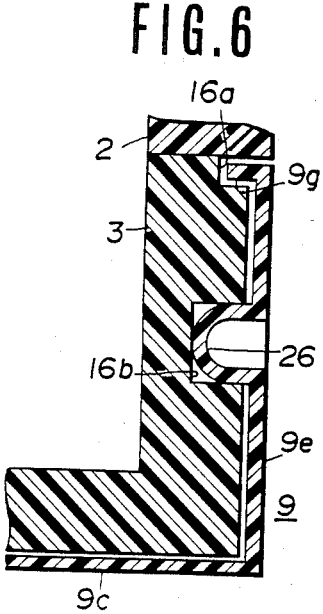
FIG. 6 is an enlarged section taken along line VI—VI of FIG. 1.

As shown in FIG. 6, the lower section 3 of the casing is formed with a pair of guide grooves 16b extending along each of the side walls parallel to each other and to stepped rests 16b. Both the rests 16b and the guide grooves 16b are not as deep as the arms 8a and 8b of the closure lid 8 are thick.

As shown in FIG. 6, the stepped rests 16a receive the upper edges 9g of the sliding closure 9. Also, the guide groove 16b slidably receives inwardly depressed indentations 26 formed in the side plates 9d and 9e of the sliding closure 9. Sliding engagement between the rests 16a and the edges 9g and between the guide grooves 16b and the indentations 26 guides sliding movement of the sliding closure 9 with respect to the cut-out portion 3a along the side walls of the lower section.

Positioning holes 10a and 10b (FIG. 3) are formed through the bottom of the lower section 3 directly under the tape guide columns 7a and 7b respectively.

Figure 7:
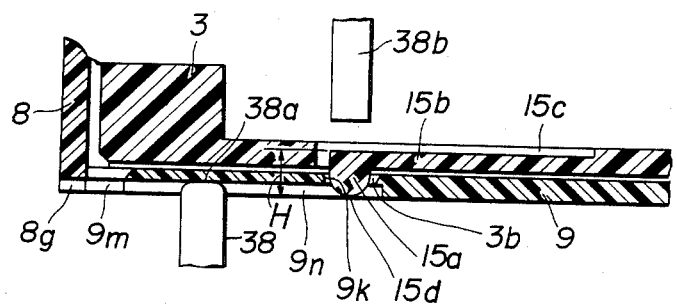
FIG. 7 is an enlarged section taken along line VII—VII of FIG. 4.

In the shown construction, when the tape cassette is not in use, the closure lid 8 is in its closed position shown in FIGS. 1 and 2 to cover the front opening. At the same time, the sliding closure member 9 is in its closed position (FIGS. 1 and 2), thus covering the cut-out 3a. In this case, the locking head 15a of the locking lever 15 is in engagement with the hole 9k as shown in FIGS. 2, 3 and 7. As will be apparent from FIG. 7, the locking head 15a of the locking lever 15 lies fully within the groove 9n so that the top 15d does not protrude downwards from the lower surface of the sliding closure member 9.

Figure 9:
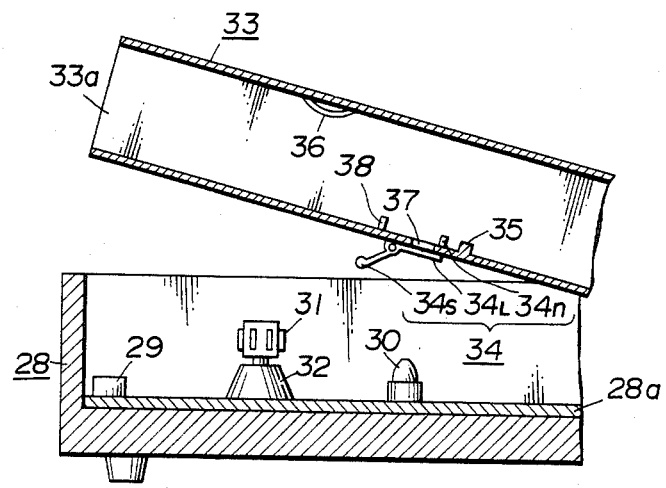
FIG. 9 is a section through a recording and reproducing apparatus (PCM recorder) with a rotary head to which the preferred embodiment of the magnetic tape cassette according to the present invention is applied.
Figure 10:
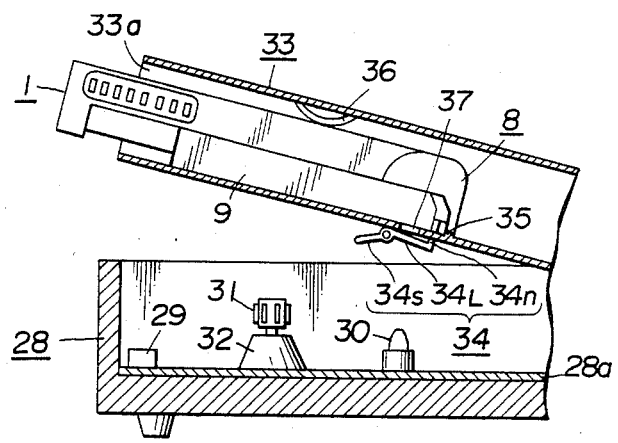
FIGS. 10, 11 and 12 are sections similar to FIG. 9, showing the process of insertion of the preferred embodiment of a magnetic tape cassette into the cassette holder.
Figure 11:
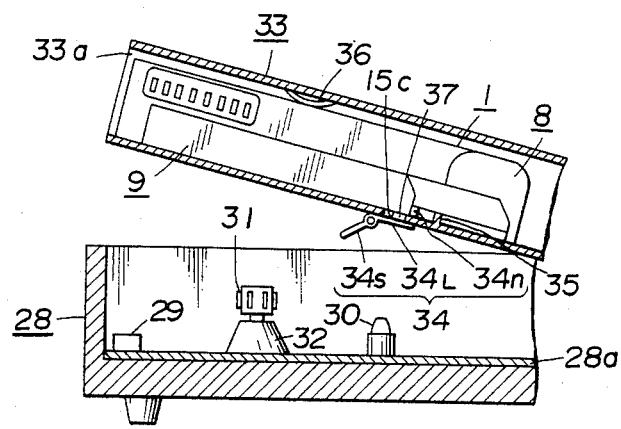

When the tape cassette is to be used in a PCM recorder, the cassette is first inserted into a cassette holder 33 as shown in FIG. 9. In order to show an example of the operation of the PCM recorder in which the preferred embodiment of the tape cassette according to the invention is used, the operation of one example of a PCM recorder will be described herebelow with reference to FIGS. 9 to 12.

A pair of locking levers 34 are built into the cassette holder 33 at points opposite each of the cut-outs 8e and 8f in the closure lid 8. Each of the locking levers 34 is pivotably secured to the bottom of the cassette holder 33 for rotation about a pivot. Each of the locking levers has a first arm section 34L with a locking claw section 34n extending upwards from the free end of the first arm section. The locking levers 34 also have a second arm section 34s extending opposite the first arm section 34L with respect to the pivot. The first and second sections 34L and 34s extend oblique to each other in such a manner that, when the first arm section 34L is parallel to the bottom of the cassette holder 33, the second arm section 34s is at an angle of about 45 degrees relative to the bottom of the cassette holder 33.

Although it is not clearly shown in the drawings, the locking lever 34 is associated with a biasing means, such as a torsion spring normally biasing the locking lever counterclockwise as viewed in FIG. 9. Therefore, as will be appreciated from FIG. 9, the first arm section 34L is normally biased toward the bottom of the cassette holder 33 and the second arm section 34s is normally held away from the bottom of the cassette holder as in FIGS. 9 to 11.

The locking claw section 34n opposes an opening (not shown) through the bottom of the cassette holder 33. In the positions shown in FIGS. 9 to 11, the locking claw section 34n extends through the opening into the internal space of the cassette holder. The position of the locking claw matches the position of the front edge of the sliding closure 9 in its rearwardly shifted or open position. The locking claw section 34n thus restricts forward movement of the sliding closure 9 after the cassette is inserted into the cassette holder as far as the position shown in FIG. 11. A spacer 35 extends upwards from the floor of the cassette holder 33 near the opening for the locking claw 34n. The spacer 35 is designed to support the lower surface of the lower section 3 after the sliding closure 9 is retracted.

The cassette holder 33 is also provided with a retainer spring 36 protruding from the ceiling of the cassette holder. The retainer spring 36 engages the upper surface of the tape cassette casing to restrict movement of the latter within the cassette holder.

The PCM recorder is also provided with an unlocking pin 38 extending vertically from the floor of the cassette holder 33. The unlocking pin is laterally offset from the position of the locking claw 34 and located in a lateral location corresponding to the groove 9n so as to contact the top 15d of the locking head 15a of the locking lever 15 as the tape cassette slides into the cassette holder 33. The height of the unlocking pin 38 is so selected that the top 38a thereof fits within the groove 9n so as to come into contact with the top 15d of the locking head 15a.

Figure 8:
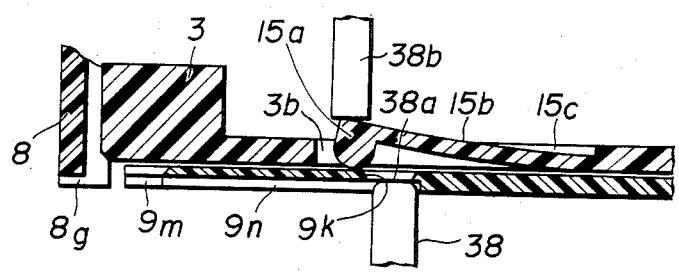
FIG. 8 is a view similar to FIG. 7, illustrating disengagement of the locking head from the sliding closure.

In order to allow the unlocking pin 38 to enter the groove 9n of the sliding closure member, another cut-out 8g is formed in the lower edge of the elongated plate 8a of the closure lid 8 near the cut-out 8e, as clearly shown in FIGS. 7 and 8.

The tape cassette is loaded prior to use into the PCM recorder 28. As the tape cassette slides into the internal space 33a of the cassette holder 33, the unlocking pin 38 passes through the cut-out 8g of the closure lid 8 into the groove 9n of the sliding closure member 9. The top 15d of the locking head 15a of the locking lever 15 protruding through the hole 3b in the lower section 3 of the cassette casing 1 comes into contact with the top 38a of the unlocking pin 38. As a result, the locking head 15a of the locking lever 15 is pushed upwardly by the unlocking pin 38, deforming the lever section 15b until the top 15d lies flush with the lower surface of the upper wall of the groove 9n. The locking claws 34n of the locking levers 34 of the cassette holder 33 of the PCM recorder 28 engage the contact members 9i and 9j of the closure member 9 through the cut-away portions 8e and 8f of the closure lid 8. Then, as the tape cassette moves further forward into the cassette holder 33, the sliding closure 9 is held stationary by the locking claws 34n of the locking lever 34, while the cassette casing 1 moves against the biasing force of the coil spring 27.

When the cassette casing 1 is inserted further into the cassette holder 33, the locking head 15a of the locking lever 15 is driven upwards out of the hole 9k to the position shown in FIG. 8 by contact with the unlocking pin 38 of the cassette holder 33. From this position, since the top 15d of the locking head 15p is rounded, an upward biasing force is applied to the locking lever 15 by the edge of the opening 9k of the sliding closure 9 as the cassette casing 1 moves relative to the sliding closure member 9. The upward biasing force applied to the locking lever 15 overcomes the downward resilient force applied by the resilient lever section 15b and moves the locking head 15a upwards until the upper and of the locking head 15a contacts a stopper 38b. Thus the sliding closure 9 disengages from the locking head 15a to allow relative displacement of the cassette casing 1 and the sliding closure 9.

Thereafter the sliding closure 9 slides backwards relative to the cassette casing 1, thus exposing the cut-out 3a and the positioning apertures 10 and 10b (FIG. 9), and aligning the apertures 9a and 9b of the closure member 9 with the reel shaft insertion apertures 5a and 5b so that the reel shaft insertion apertures 5a and 5b are opened.

Figure 12:
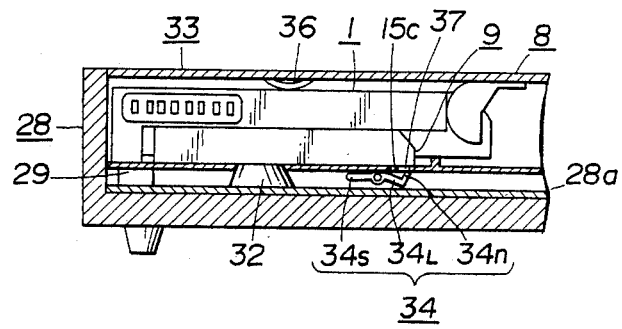

After the cassette has been fully inserted into the cassette holder 33, the locking head 15a comes into alignment with the cut-out 9m and drops through the cut-out 9m. Thus, the locking head 15a of the locking lever 15 establishes locking engagement between the sliding closure 9 and cassette casing 1 again, as shown in FIG. 12. From this position, the cassette holder 33 is ready to be lowered into the recording and reproducing system 28 to the position shown in FIG. 13, which position is specified by a spacer 29.

The closure lid 8 is then rotated upwards by the lid actuating pins (not shown) of the PCM recorder to the position shown in FIG. 2.

Positioning protrusions 30 and reel shafts 31 of the PCM recorder 28 are respectively inserted into the positioning apertures 10a and 10b and the reel shaft insertion apertures 5a and 5b, the magnetic tape 6 is exposed at the front of the cassette casing 1, and the tape guide system (not shown) is inserted into the cut-out portion 3a. The guide system draws out some of the magnetic tape and loads it onto the rotary drum of the recording and reproducing apparatus, and then the desired recording or playback can be carried out. Reference numeral 32 designates the base of the reel shaft 31.

When the magnetic tape cassette is taken out of service, a procedure opposite to that described above is carried out.

It will be apparent from the preceding description of the preferred embodiments of the invention that many modifications and variations can be effected by one skilled in the art without departing from the scope of the invention. Accordingly, the scope of the invention should be determined by the appended claims only.

What is claimed is:

1. A magnetic tape cassette comprising:
   a cassette casing having a mouth through which a magnetic tape is accessible, said mouth including a first opening in a front end face of said casing and a second opening in a lower section of the casing adjacent said front end face;
   a pivotal lid pivotable between a closed position covering said first opening of said mouth and an open position exposing said first opening of said mouth;
   a sliding shutter member slidable with respect to a lower section of said cassette casing between a first position in which it covers said second opening and a second position in which it exposes said second opening; said shutter member including first and second means for engagingly receiving a locking head of a locking lever at first and second positions of said shutter; and
   a resilient locking lever integrally formed with said cassette casing and having a resiliently deformable lever and a locking head engageable with said shutter member, said locking lever normally holding said shutter member in said first position while said cassette is not in use, and allowing said shutter member to move to said second position when said cassette is inserted into an associated recording and reproducing apparatus, and holding said shutter member at said second position while said cassette is used.

2. The magnetic tape cassette as set forth in claim 1, wherein said shutter member is formed with a groove into which said locking head protrudes through one of said first and second locking head receiving means.

3. The magnetic tape cassette as set forth in claim 1, wherein said first and second receiving means are vacancies defined in said shutter member for allowing said locking head to pass therethrough.

4. The magnetic tape cassette as set forth in claim 3, wherein said first receiving means is a circular hole disposed so as to engage said locking head in said first position of said shutter member, and said second receiving means is a semi-circular hole disposed as to engage said locking head in said second position of said shutter member.

5. The magnetic tape cassette as set forth in claim 3, wherein said first receiving means is a circular hole disposed so as to engage said locking head in said first position of said shutter member, and said second receiving means is a circular hole disposed so as to engage said locking head in said second position of said shutter member.

6. The magnetic tape cassette as set forth in claim 4, wherein said shutter member is formed with a groove into which groove said locking head protrudes through one of said first and second locking head receiving means.

7. The magnetic tape cassette as set forth in claim 5, wherein said shutter member is formed with a groove into which groove said locking head protrudes through one of said first and second locking head receiving means.

8. The magnetic tape cassette as set forth in claim 2, wherein the depth of said groove at least matches the corresponding dimension of said locking head protruding from said shutter member.

9. The magnetic tape cassette as set forth in claim 6, wherein the depth of said groove at least matches the corresponding dimension of said locking head protruding from said shutter member.

10. The magnetic tape cassette as set forth in claim 7, wherein the depth of said groove at least matches the corresponding dimension of said locking head protruding from said shutter member.

11. The magnetic tape cassette as set forth in claim 8, wherein said locking lever has a locking head engageable to said shutter member when said locking lever is in a first lever position and disengageable from said shutter member to allow sliding movement of said shutter member when said locking lever is in a second lever position.

12. The magnetic tape cassette as set forth in claim 11, wherein said locking lever is moved from said first lever position to said second lever position when the cassette is inserted into said recording and reproducing apparatus.

13. The magnetic tape cassette as set forth in claim 12, wherein recording and reproducing apparatus includes hooking means including a hook releasably engaging said shutter and exerting a sliding force thereupon as said cassette is inserted into said recording and reproducing apparatus.

14. A magnetic tape cassette comprising:
a cassette casing having a mouth through which a magnetic tape is accessible, said mouth including a first opening in a front end face of said casing and a second opening in a lower section of the casing adjacent said front end face, and a pair of reel shaft apertures through which driving hubs of tape reels are accessible;
a pivotable lid for pivoting between a closed position covering said first opening of said mouth and a second position exposing said first opening of said mouth;
a sliding shutter member freely slidable in a front-to-rear direction between first and second sliding positions, said reel shaft apertures and said second opening being exposed in said first sliding position, and said reel shaft apertures and said second opening being covered by said shutter member in said second sliding position, said sliding shutter member cooperating with said pivotal lid in said second sliding position in such a manner that said shutter member prevents said pivotal lid from pivoting to said open position to expose said first opening, wherein said shutter member is provided with first and second means engagingly receiving a locking head of a locking lever in said first and second positions of said shutter; and
a resilient locking lever integrally formed with said cassette casing and having a locking head engageable with said shutter member at said first and second positions of the latter and a resiliently deformable lever section deformable between a first locking position and a second unlocking position, said lever section normally biasing said head toward said first locking position, and said locking lever normally holding said shutter member in said second position while said cassette is not in use, allowing said shutter member to move to said first position when said cassette is inserted into an associated recording and reproducing apparatus and holding said sliding shutter in said first position while said cassette is in use.

15. The magnetic tape cassette as set forth in claim 14, wherein said shutter member is formed with a groove into which groove said locking head protrudes through one of said first and second locking head receiving means.

16. The magnetic tape cassette as set forth in claim 15, wherein said first and second receiving means are vacancies defined in said shutter member for allowing said locking head to pass therethrough.

17. The magnetic tape cassette as set forth in claim 16, which further comprises a guide means associated with said casing and said shutter member for guiding sliding movement of said shutter member between said first and second positions.

18. The magentic tape cassette as set forth in claim 17, wherein said guide means comprises a guide groove formed in one of said casing and said shutter member and a projection protruding from the other of said cassette casing and said shutter.

19. A magnetic tape cassette comprising:
a cassette casing having a mouth through which a magnetic tape is accessible, said mouth including a first opening in a front end face of said casing and a second opening in a lower section of the casing-adjacent said front end face;
a pivotal lid pivotable between a closed position covering said first opening of said mouth and an open position exposing said first opening of said mouth;
a sliding shutter member slidable with respect to the lower section of said cassette casing between a first position in which it covers said second opening and a second position in which it exposes said second opening, wherein said shutter member is formed with a groove, into which groove a locking head protrudes through one of first and second locking head receiving means on said shutter member; and
a resilient locking lever integrally formed with said cassette casing and having a resiliently deformable lever and a round head engageable with said shutter member, said locking lever normally holding said shutter member in said first position while said cassette is not in use, and allowing said shutter member to move to said second position when said cassette is inserted into an associated recording and reproducing apparatus; and holding said shutter member at said second position while said cassette is used.

20. A magnetic tape cassette comprising:
a cassette casing having a mouth through which a magnetic tape is accessible, said mouth including a first opening in a front end face of said casing and a second opening in a lower section of the casing adjacent said front end face, and a pair of reel shaft apertures through which driving hubs of tape reels are accessible;
a pivotable lid for pivoting between a closed position covering said first opening of said mouth and a second position exposing said first opening of said mouth;
a sliding shutter member freely slidable in a front-to-rear direction between first and second sliding positions, said reel shaft apertures and said second opening being exposed in said first sliding position, and said reel shaft apertures and said second opening being covered by said shutter member in said second sliding position, said sliding shutter member cooperating with said pivotal lid in said second sliding position in such a manner that said shutter member prevents said pivotable lid from pivoting to said open position to expose said first opening, wherein said shutter member is formed with a groove, into which groove a locking head protrudes through one of first and second locking head receiving means,; and
a resilient locking lever integrally formed with said cassette casing and having a locking head engageable with said shutter member at said first and second positions of the latter and a resiliently deformable lever section deformable between a first locking position and a second unlocking position, said lever section normally biasing said head toward said first locking position, and said locking lever normally holding said shutter member in said second position while said cassette is not in use, allowing said shutter member to move to said first position when said cassette is inserted into an associated recording and reproducing apparatus and holding said sliding shutter in said first position while said cassette is in use.

* * * * *